(12) United States Patent
Wang et al.

(10) Patent No.: US 9,661,476 B2
(45) Date of Patent: May 23, 2017

(54) METHOD AND APPARATUS FOR FACILITATING MULTICAST SERVICE

(75) Inventors: Haifeng Wang, Shanghai (CN); Zhenhong Li, Shanghai (CN); Jorma Lilleberg, Oulu (FI); Ting Zhou, Shanghai (CN); Jing Xu, Shanghai (CN)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 534 days.

(21) Appl. No.: 14/124,305

(22) PCT Filed: Jun. 9, 2011

(86) PCT No.: PCT/CN2011/075503
§ 371 (c)(1),
(2), (4) Date: Dec. 6, 2013

(87) PCT Pub. No.: WO2012/167432
PCT Pub. Date: Dec. 13, 2012

(65) Prior Publication Data
US 2014/0105096 A1    Apr. 17, 2014

(51) Int. Cl.
| H04W 4/08 | (2009.01) |
| H04W 4/06 | (2009.01) |
| H04W 72/00 | (2009.01) |
| H04L 12/18 | (2006.01) |
| H04W 8/18 | (2009.01) |
| H04W 76/00 | (2009.01) |

(52) U.S. Cl.
CPC ............. *H04W 4/08* (2013.01); *H04L 12/189* (2013.01); *H04W 4/06* (2013.01); *H04W 8/186* (2013.01); *H04W 72/005* (2013.01); *H04W 76/002* (2013.01)

(58) Field of Classification Search
None
See application file for complete search history.

(56) References Cited

U.S. PATENT DOCUMENTS

| 7,860,093 B2 | 12/2010 | Shepherd et al. |
| 8,018,933 B2 | 9/2011 | Dickens et al. |
| 2007/0263626 A1* | 11/2007 | Warden ............... H04L 12/1868 370/390 |
| 2009/0122762 A1* | 5/2009 | Kitazoe ................. H04W 12/04 370/331 |
| 2010/0058405 A1 | 3/2010 | Ramakrishnan et al. |
| 2011/0159799 A1* | 6/2011 | Chen ..................... H04L 1/1867 455/3.01 |

\* cited by examiner

*Primary Examiner* — Ayaz Sheikh
*Assistant Examiner* — Sori Aga
(74) *Attorney, Agent, or Firm* — Oblon, McClelland, Maier & Neustadt, L.L.P.

(57) ABSTRACT

A method is provided for facilitating multicast service. The method may include receiving data multicast to members of a multicast group. The method may further include determining, based at least in part on an indication received during multicast of the data, that a late joining device has joined the multicast group subsequent to initiation of the multicast. The method may additionally include marking, based at least in part on the received indication, a point at which the late joining device began to participate in the multicast. A corresponding apparatus and computer program product are also provided.

20 Claims, 9 Drawing Sheets

METHOD AND APPARATUS FOR FACILITATING MULTICAST SERVICE

TECHNOLOGICAL FIELD

Embodiments of the present invention relate generally to wireless communication technology and, more particularly, relate to an apparatus, method and computer program product for facilitating multicast service.

BACKGROUND

The modern communications era has brought about a tremendous expansion of wireless network technology, driven by consumer demands. This expansion of wireless and mobile networking technologies have addressed related consumer demands, while providing more flexibility and immediacy of information transfer and providing convenience to users.

For example, ongoing development of device-to-device (D2D) cluster communications has provided for exchange of information via direct links among a number of adjacent devices. D2D communication is becoming increasingly popular with the development of advanced cellular wireless networks, such as Long Term Evolution (LTE) networks, due to spectrum savings and improved system capacity that may result from use of D2D communications. As another example, the expansion of wireless and mobile networking technologies has provided ongoing improvements in multicast services, where data is transmitted to multiple recipients using a shared resource.

BRIEF SUMMARY OF EXAMPLE EMBODIMENTS

Methods, apparatuses and computer program products are provided herein for facilitating multicast service. Embodiments provided herein may provide several advantages to network providers, wireless service providers, computing devices, and computing device users. For example, some example embodiments enable a device to join a multicast group subsequent to initiation of the multicast. In this regard, some such example embodiments facilitate the transmission to the late joining device of the missing data portion that was multicast prior to the late joining device participating in the multicast by one or more members of the multicast group via D2D communication. Accordingly, the network entity multicasting the data may be saved from having to transmit the same data first to the original members of the multicast group, and then to the late joining device. Further, such example embodiments may provide higher spectrum efficiency, as transmission of the missing data portion to the late joining device by D2D communication may provide greater spectrum efficiency compared to multicasting or unicasting the missing portion to the late joining device.

In a first example embodiment, a method is provided, which may comprise receiving data multicast to members of a multicast group. The method of this example embodiment may further comprise determining, based at least in part on an indication received during multicast of the data, that a late joining device has joined the multicast group subsequent to initiation of the multicast. The method of this example embodiment may additionally comprise marking, based at least in part on the received indication, a point at which the late joining device began to participate in the multicast.

In another example embodiment, an apparatus comprising at least one processor and at least one memory including computer program code is provided. The at least one memory and the computer program code may be configured to, with the at least one processor, cause the apparatus of this example embodiment at least to perform receiving data multicast to members of a multicast group. The at least one memory and the computer program code may be configured to, with the at least one processor, further cause the apparatus of this example embodiment to perform determining, based at least in part on an indication received during multicast of the data, that a late joining device has joined the multicast group subsequent to initiation of the multicast. The at least one memory and the computer program code may be configured to, with the at least one processor, also cause the apparatus of this example embodiment to perform marking, based at least in part on the received indication, a point at which the late joining device began to participate in the multicast.

In a further example embodiment, a computer program product comprising at least one non-transitory computer-readable storage medium having computer-readable program code instructions stored therein is provided. The computer-readable program code instructions may include program code instructions configured to cause receipt of data multicast to members of a multicast group. The program code instructions may further include program code instructions configured to determine, based at least in part on an indication received during multicast of the data, that a late joining device has joined the multicast group subsequent to initiation of the multicast. The program code instructions may further include program code instructions configured to mark, based at least in part on the received indication, a point at which the late joining device began to participate in the multicast.

In yet another example embodiment, an apparatus is provided, which may comprise means for receiving data multicast to members of a multicast group. The apparatus of this example embodiment may further comprise means for determining, based at least in part on an indication received during multicast of the data, that a late joining device has joined the multicast group subsequent to initiation of the multicast. The apparatus of this example embodiment may additionally comprise means for marking, based at least in part on the received indication, a point at which the late joining device began to participate in the multicast.

In still a further example embodiment, a method is provided, which may comprise causing data to be multicast to members of a multicast group. The method of this example embodiment may further comprise, in response to a late joining device joining the multicast group subsequent to initiation of the multicast, causing an indication of the late joining device joining the multicast group to be sent to members of the multicast group participating in the multicast prior to the late joining device joining the multicast group. The indication may be indicative of a point at which the late joining device began to participate in the multicast. The method of this example embodiment may additionally comprise continuing to cause the data to be multicast to members of the multicast group, including the late joining device.

In another example embodiment, an apparatus comprising at least one processor and at least one memory including computer program code is provided. The at least one memory and the computer program code may be configured to, with the at least one processor, cause the apparatus of this example embodiment at least to perform causing data to be multicast to members of a multicast group. The at least one memory and the computer program code may be configured to, with the at least one processor, further cause the apparatus of this example embodiment to perform, in response to a late joining device joining the multicast group subsequent to initiation of the multicast, causing, an indication of the late joining device joining the multicast group to be sent to members of the multicast group participating in the multicast prior to the late joining device joining the multicast group. The indication may be indicative of a point at which the late joining device began to participate in the multicast. The at least one memory and the computer program code may be configured to, with the at least one processor, also cause the apparatus of this example embodiment to perform continuing to cause the data to be multicast to members of the multicast group, including the late joining device.

In a further example embodiment, a computer program product comprising at least one non-transitory computer-readable storage medium having computer-readable program code instructions stored therein is provided. The computer-readable program code instructions may include program code instructions configured to cause data to be multicast to members of a multicast group. The program code instructions of this example embodiment may further include program code instructions configured, in response to a late joining device joining the multicast group subsequent to initiation of the multicast, to cause an indication of the late joining device joining the multicast group to be sent to members of the multicast group participating in the multicast prior to the late joining device joining the multicast group. The indication may be indicative of a point at which the late joining device began to participate in the multicast. The program code instructions of this example embodiment may additionally include program code instructions configured to continue to cause the data to be multicast to members of the multicast group, including the late joining device.

In yet another example embodiment, an apparatus is provided, which may comprise means for causing data to be multicast to members of a multicast group. The apparatus of this example embodiment may further comprise means for, in response to a late joining device joining the multicast group subsequent to initiation of the multicast, causing an indication of the late joining device joining the multicast group to be sent to members of the multicast group participating in the multicast prior to the late joining device joining the multicast group. The indication may be indicative of a point at which the late joining device began to participate in the multicast. The apparatus of this example embodiment may additionally comprise means for continuing to cause the data to be multicast to members of the multicast group, including the late joining device.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE SEVERAL VIEWS OF THE DRAWINGS

Figure 1:
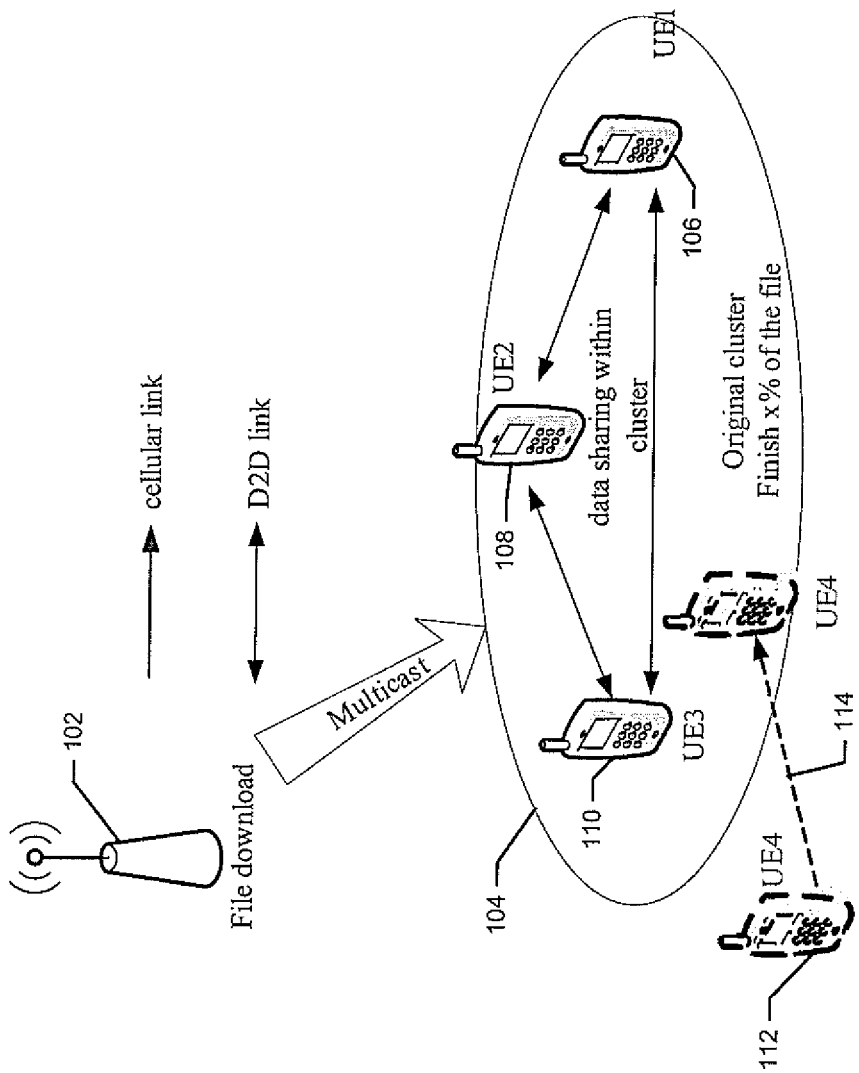
Figure 2:
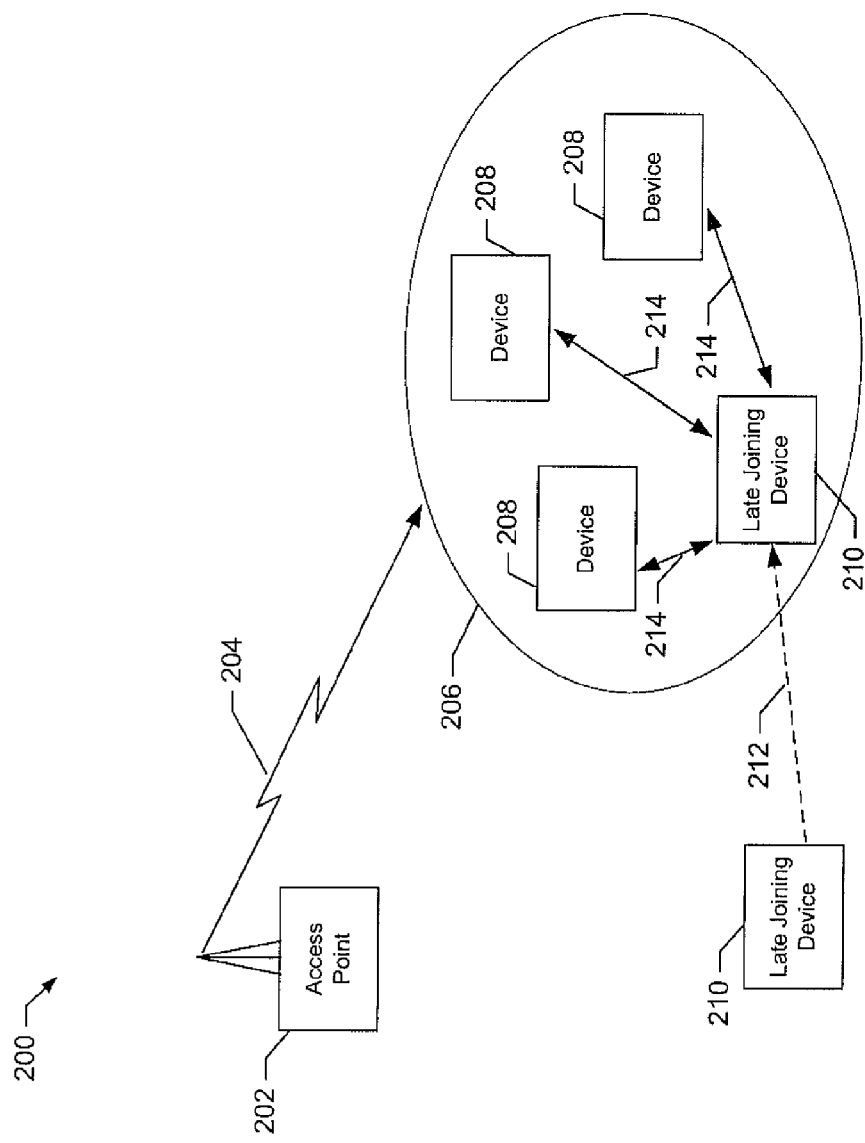
Figure 3:
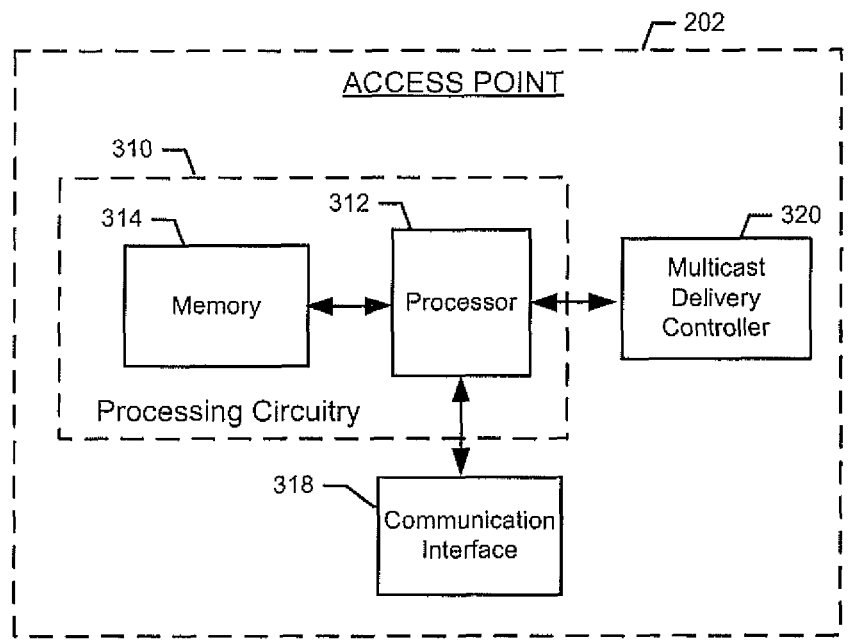
Figure 4:
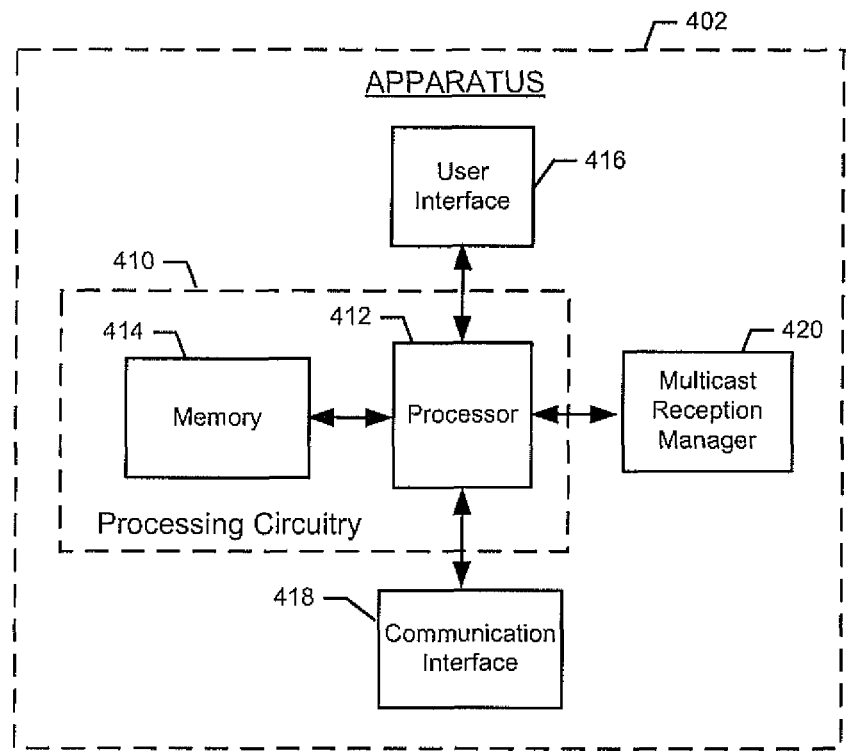
Figure 5:
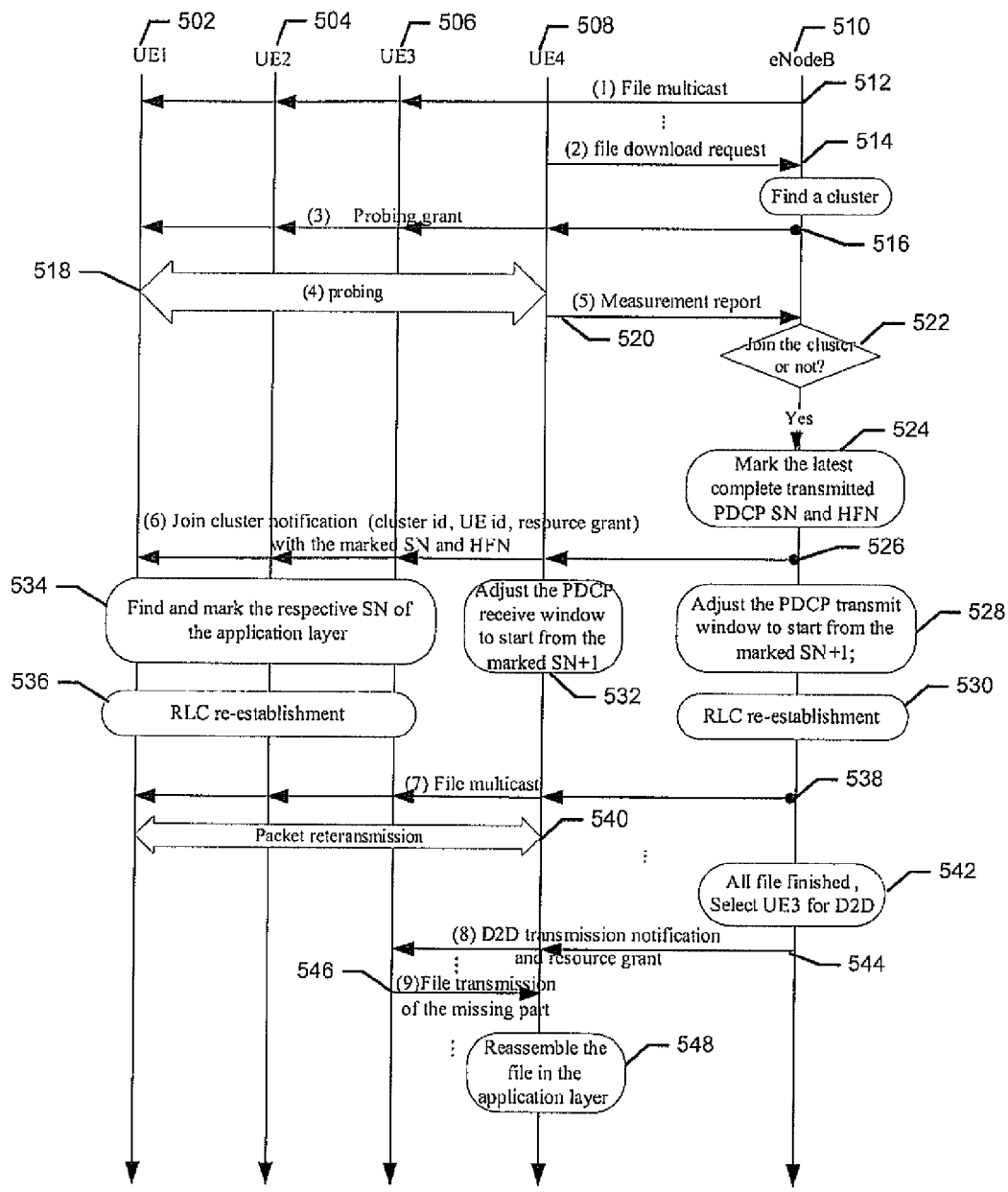
Figure 6:
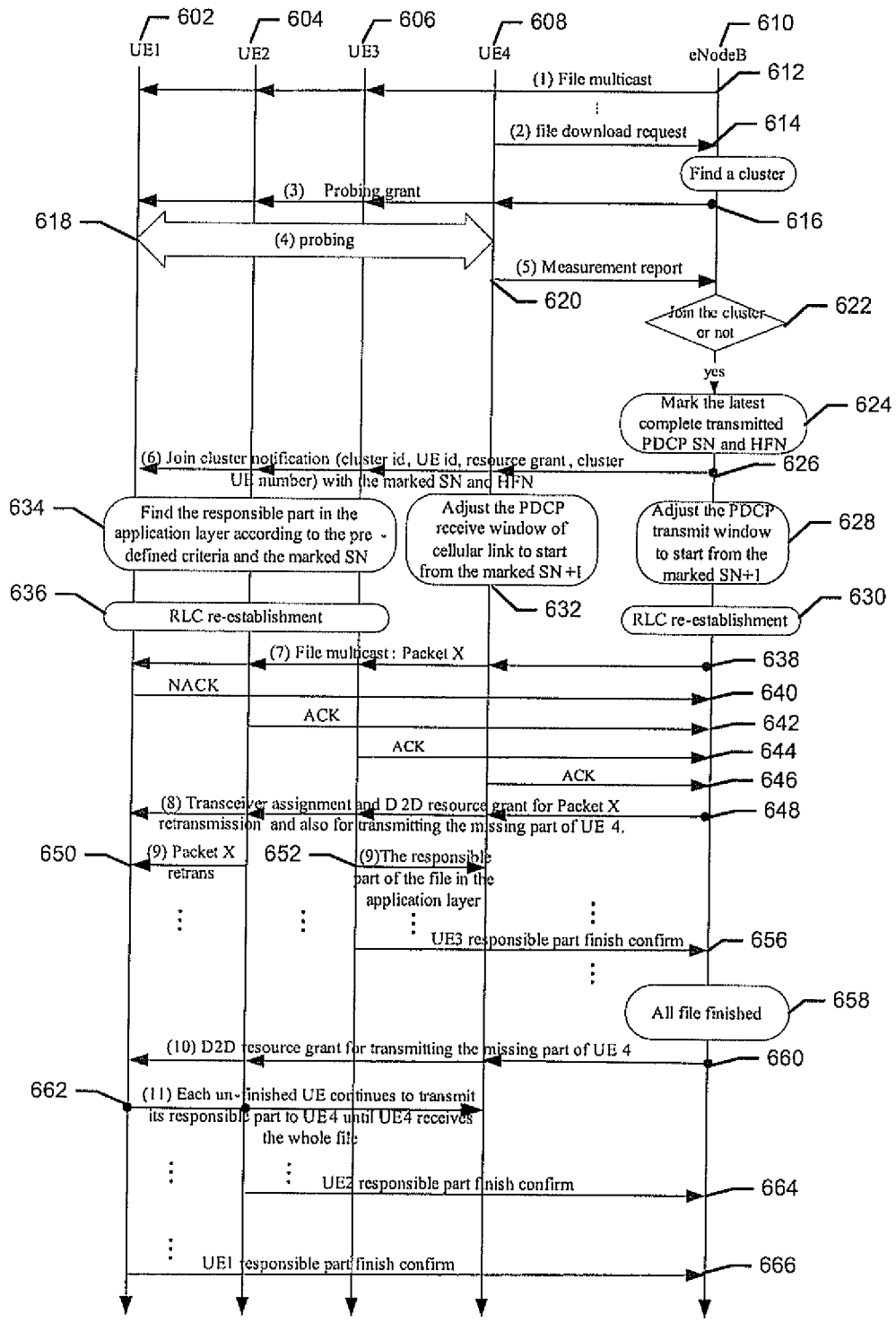
Figure 7:
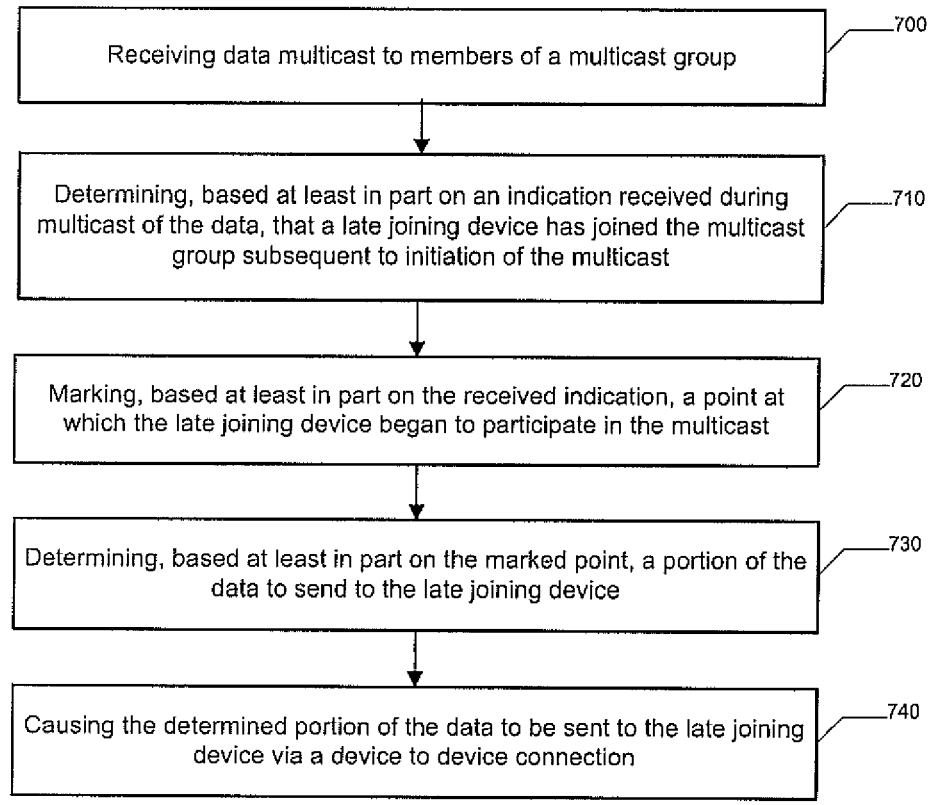
Figure 8:
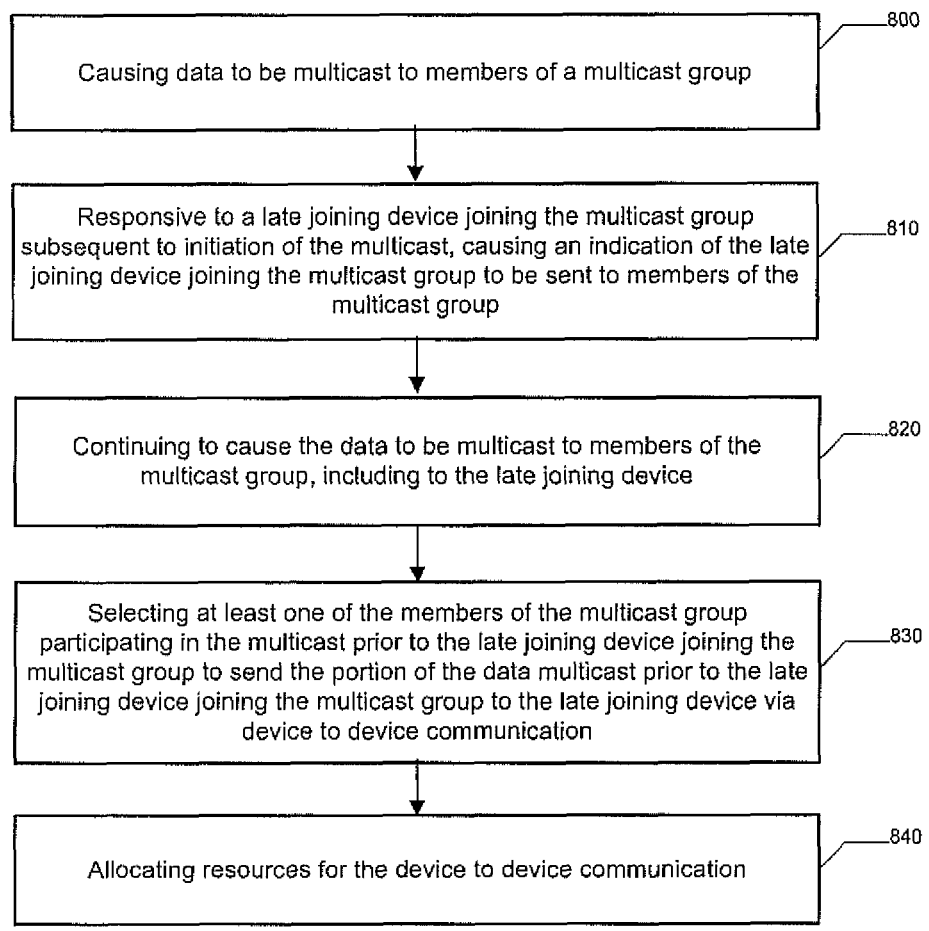
Figure 9:
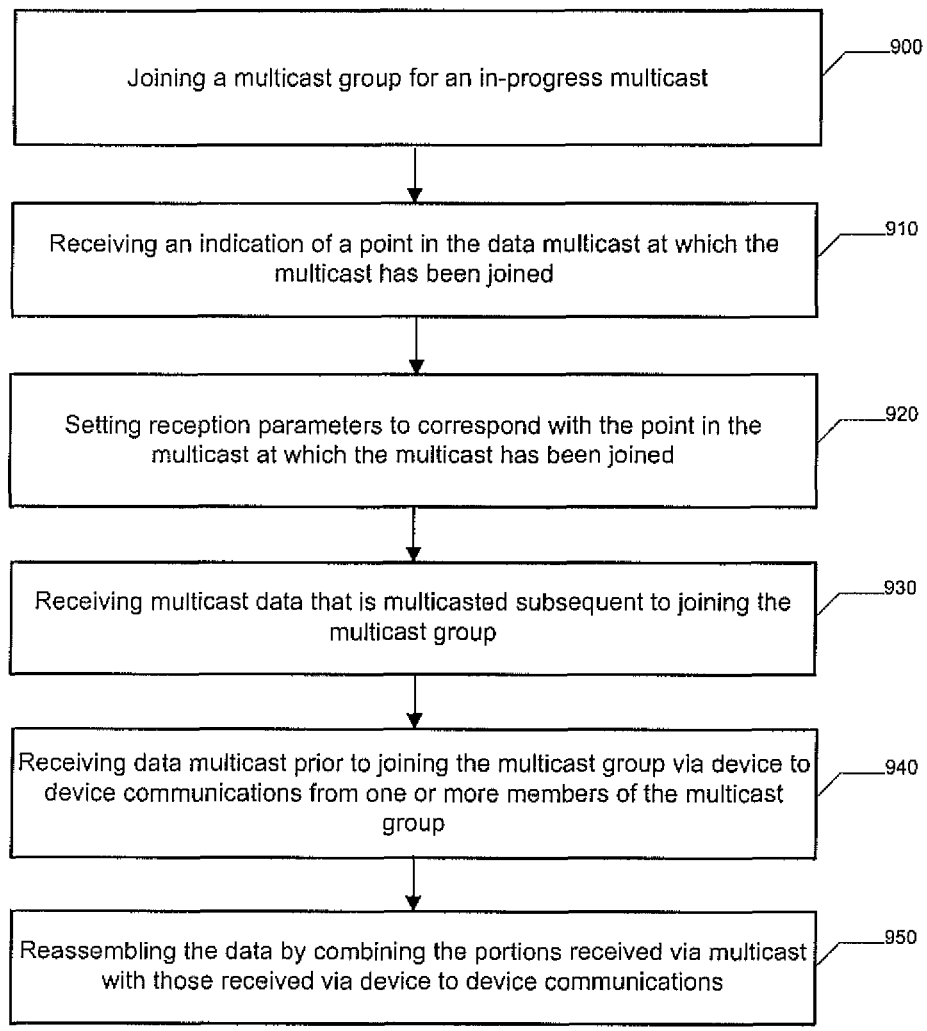

Having thus described embodiments of the invention in general terms, reference will now be made to the accompanying drawings, which are not necessarily drawn to scale, and wherein:

FIG. 1 illustrates an example scenario in which some example embodiments may be applied;

FIG. 2 illustrates a system for facilitating multicast service according to some example embodiments;

FIG. 3 illustrates a block diagram of an access point for facilitating multicast service in accordance with some example embodiments;

FIG. 4 illustrates a block diagram of an apparatus for facilitating multicast service in accordance with some example embodiments;

FIG. 5 illustrates an example signaling diagram of signals that may be exchanged to facilitate multicast service in accordance with some example embodiments;

FIG. 6 illustrates another example signaling diagram of signals that may be exchanged to facilitate multicast service in accordance with some example embodiments;

FIG. 7 illustrates a flowchart according to an example method for facilitating multicast service according to some example embodiments;

FIG. 8 illustrates a flowchart according to another example method for facilitating multicast service according to some example embodiments; and FIG. 9 illustrates a flowchart according to a yet another example method for facilitating multicast service according to some example embodiments.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry"

would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

FIG. 1 illustrates an example scenario in which some example embodiments may be applied. In the example of FIG. 1, three user equipment devices (UEs)—the UE 106, UE 108, and UE 110—may be interested in a file, such as a movie, that may be downloaded via the access point 102. The access point 102 may, for example, comprise an evolved node B (eNB) of an LTE system. The UEs 106, 108, and 110 may form a D2D cluster and corresponding multicast group, denoted by the coverage area 104. The access point 102 may multicast the file to the multicast group within the coverage area 104, such as via a cellular link.

During the course of the multicast, a fourth UE, the UE 112 may enter the coverage area 104 of the D2D cluster, as illustrated by the path 114. The UE 112 may be interested in the file that is being multicast. However, by the time the UE 112 enters the coverage area 104, a portion (e.g., x %) of the file may have already been multicasted to the UEs in the multicast group.

Existing protocols, including current LTE protocol, do not allow the UE 112 to join the multicast group and receive the remaining portion (e.g., the remaining 100–x %) of the file from the access point 102 as a member of the multicast group. In this regard, for example, under current LTE protocol, only the application layer may hold all of the packets of a service file. The packet data units (PDUs) of lower protocol layers are released after some time due to successful transmission or forwarding of a packet to a higher layer. If the file were to be transmitted to the UE 112 from different radio bearers (e.g., the first x % of the file that the UE 112 missed prior to joining the multicast group by unicast, and the last 100–x % of the file via multicast after joining the multicast group), the UE 112 may only reassemble the packets in the application layer. However, in current LTE (LTE-Advanced) protocol, the user plane protocol in the eNB is only up to the packet data convergence protocol (PDCP) layer. The eNB is blind to the application layer, as the application layer ends through the internet. Accordingly, under present protocols, the UE 112 cannot receive the missing parts of the file from the access point 102 by different radio bearers, as there is no way for the UE 112 to reassemble the file. As such, present protocols do not facilitate multicasting to a late joining device that may join a multicast group subsequent to initiation of the multicast.

Example embodiments disclosed herein may address the deficiencies of present protocols by facilitating multicasting in instances in which a late joining device, such as the UE 112, joins a multicast group subsequent to initiation of a multicast to the existing members of the multicast group. Referring now to FIG. 2, a system 200 for facilitating multicast service according to some example embodiments is illustrated. It will be appreciated that the system 200 as well as the illustrations in other figures are each provided as an example of an embodiment(s) and should not be construed to narrow the scope or spirit of the disclosure in any way. In this regard, the scope of the disclosure encompasses many potential embodiments in addition to those illustrated and described herein. As such, while FIG. 2 illustrates one example of a configuration of a system for facilitating multicast service, numerous other configurations may also be used to implement embodiments of the present invention.

The system 200 may include an access point 202 that may provide access to a network (not illustrated). In this regard, the access point 102 may be configured to provide access to one or more wireless networks (for example, a cellular network, wireless local area network, wireless metropolitan area network, and/or the like), one or more wireline networks, or some combination thereof, and in some embodiments may provide access to the internet. By way of example, the access point 202 may provide access to a network employing one or more mobile access mechanisms, such as Long Term Evolution (LTE), LTE Advanced (LTE-A), Time Division Synchronous Code Division Multiple Access (TD-SCDMA), wideband code division multiple access (W-CDMA), CDMA2000, global system for mobile communications (GSM), general packet radio service (GPRS), and/or the like.

As such, by way of example, the access point 202 may comprise an access point for a cellular network, such as a base station, base transceiver station, node B, evolved node B (eNB), and/or the like. In some example embodiments described herein, the access point 102 may comprise an eNB configured to provide access to an LTE network (e.g., an LTE network, LTE-Advanced network, or a network using some other present or future implementation of an LTE technology). It will be appreciated, however, that embodiments are not limited to implementation in a cellular network utilizing an LTE technology. In this regard, example embodiments of the access point 202 and other devices and apparatuses disclosed herein may be employed in accordance with any wireless networking technology, protocol, or standard that is currently implemented, or which may be developed in the future in which multicasting and D2D communication may be supported.

Although illustrated as a single entity, in some example embodiments, the access point 202 may further comprise one or more supporting network nodes or other entities. Further, functionalities attributed to the access point 202 in accordance with various example embodiments may, in some example embodiments be performed by multiple apparatuses, which may act in concert to provide functionalities attributed to the access point 202.

FIG. 3 illustrates a block diagram of an access point 202 in accordance with some example embodiments. In this regard, FIG. 3 illustrates an apparatus that may comprise or be employed on an access point 202, and which may be configured to perform at least some of the functionality of an access point 202 as described herein. However, it should be noted that the components, devices or elements illustrated in and described with respect to FIG. 3 below may not be mandatory and thus some may be omitted in certain embodiments. Additionally, some embodiments may include further or different components, devices or elements beyond those illustrated in and described with respect to FIG. 3.

Referring now to FIG. 3, the access point 202 may include or otherwise be in communication with processing circuitry 310 that is configurable to perform actions in accordance with example embodiments disclosed herein. The processing circuitry 310 may be configured to perform data processing, application execution and/or other processing and management services according to one or more example embodiments. In some embodiments, the access point 202 or the processing circuitry 310 may be embodied as or comprise a chip or chip set. In other words, the access point 202 or the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The access point 202 or portion thereof, such as the processing circuitry 310, may therefore, in some cases, be configured to implement an embodiment of the invention on a single chip or as a single "system on a chip." As such, in some cases, a chip or chipset may constitute means for performing one or more operations for providing the functionalities described herein.

In some example embodiments, the processing circuitry 310 may include a processor 312 and, in some embodiments, such as that illustrated in FIG. 3, may further include memory 314. The processing circuitry 310 may be in communication with or otherwise control a communication interface 318. As such, the processing circuitry 310 may be embodied as a circuit chip (e.g., an integrated circuit chip) configured (e.g., with hardware, software or a combination of hardware and software) to perform operations described herein. However, in some embodiments, the processing circuitry 310 may be embodied as a portion of a server, computer, workstation or other computing device.

The communication interface 318 may include one or more interface mechanisms for enabling communication with other devices and/or networks. In some cases, the communication interface 318 may be any means such as a device or circuitry embodied in either hardware, or a combination of hardware and software that is configured to receive and/or transmit data from/to a network and/or any other device or module in communication with the processing circuitry 310. By way of example, the communication interface 318 may enable multicasting data to a device(s) 208 and/or to a late joining device(s) 210 over a radio interface, such as a link 204. In this regard, the communication interface 318 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In some example embodiments, the memory 314 may include one or more non-transitory memory devices such as, for example, volatile and/or non-volatile memory that may be either fixed or removable. The memory 314 may be configured to store information, data, applications, instructions or the like for enabling the access point 202 to carry out various functions in accordance with one or more example embodiments. For example, the memory 314 may be configured to buffer input data for processing by the processor 312. Additionally or alternatively, the memory 314 may be configured to store instructions for execution by the processor 312. As yet another alternative, the memory 314 may include one or more databases that may store a variety of files, contents or data sets. Among the contents of the memory 314, applications may be stored for execution by the processor 312 in order to carry out the functionality associated with each respective application. In some cases, the memory 314 may be in communication with the processor 312, such as via a bus, for passing information among components of the access point 202.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In some example embodiments, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry in the form of processing circuitry 310) capable of performing operations according to embodiments of the present invention while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform one or more operations described herein.

In some example embodiments, the processor 312 (or the processing circuitry 310) may be embodied as, include, or otherwise control a multicast delivery controller 320. As such, the multicast delivery controller 320 may be embodied as various means, such as circuitry, hardware, a computer program product comprising computer readable program instructions stored on a computer readable medium (for example, the memory 314) and executed by a processing device (for example, the processor 312), or some combination thereof. The multicast delivery controller 320 may be capable of communication with one or more of the memory 314 or communication interface 318 to access, receive, and/or send data as may be needed to perform one or more of the functionalities of the multicast delivery controller 320 as described herein.

Referring again to FIG. 2, the system 200 may further comprise a plurality of communication devices, such as the devices 208 and late joining device 210. These devices may be embodied as any type of computing device configured to interface with the access point 202 to obtain network access, such as by way of a cellular connection, and communicate with each other by D2D communication. By way of non-limiting example, the devices 208 and/or late joining device 210 may each respectively be embodied as mobile communication device, such as, a mobile telephone, personal digital assistant (PDA), smart phone, tablet computing device, pager, laptop computer, portable game device, or any of numerous other hand held or portable communication devices, computation devices, content generation devices, content consumption devices, or combinations thereof.

FIG. 4 illustrates a block diagram of an apparatus 402 for facilitating multicast service that may comprise or be employed on a device 208 and/or on a late joining device 210 in accordance with some example embodiments. As such, the apparatus 402 may be configured to perform at least some functionality of a device 208 and/or of a late joining apparatus 210 as described herein. However, it should be noted that the components, devices or elements illustrated in and described with respect to FIG. 4 below may not be mandatory and thus some may be omitted in certain embodiments. Additionally, some embodiments may include further or different components, devices or elements beyond those illustrated in and described with respect to FIG. 4.

Referring now to FIG. 4, the apparatus 402 may include or otherwise be in communication with processing circuitry 410 that is configurable to perform actions in accordance with example embodiments disclosed herein. The processing circuitry 410 may be configured to perform data processing, application execution and/or other processing and management services according to one or more example embodiments. In some embodiments, the apparatus 402 or a portion(s) or component(s) thereof, such as the processing circuitry 410, may be embodied as or comprise a chip or chip set. In other words, the apparatus 402 or the processing circuitry 410 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 402 or the processing circuitry 410 may therefore, in some cases, be configured to implement an embodiment of the invention on a single chip or as a single "system on a chip." As such, in some cases, a chip or chipset may constitute means for performing one or more operations for providing the functionalities described herein.

In some example embodiments, the processing circuitry 410 may include a processor 412 and, in some embodiments, such as that illustrated in FIG. 4, may further include memory 414. The processing circuitry 410 may be in communication with or otherwise control a user interface 416 and/or a communication interface 418. As such, the processing circuitry 410 may be embodied as a circuit chip (e.g., an integrated circuit chip) configured (e.g., with hardware, software or a combination of hardware and software) to perform operations described herein.

The user interface 416 (if implemented) may be in communication with the processing circuitry 410 to receive an indication of a user input at the user interface 416 and/or to provide an audible, visual, mechanical or other output to the user. As such, the user interface 416 may include, for example, a keyboard, a mouse, a joystick, a display, a touch screen, a microphone, a speaker, and/or other input/output mechanisms.

The communication interface 418 may include one or more interface mechanisms for enabling communication with other devices and/or networks. In some cases, the communication interface 418 may be any means such as a device or circuitry embodied in either hardware, or a combination of hardware and software that is configured to receive and/or transmit data from/to a network and/or any other device or module in communication with the processing circuitry 410. By way of example, the communication interface 418 may be configured to enable receipt of data multicast by the access point 202, such as via a link 204. As another example, the communication interface 418 may support D2D communication with another apparatus 402, a device 208, late joining device 210, and/or the like, such as via a D2D link 214. In this regard, the communication interface 418 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In some example embodiments, the memory 414 may include one or more non-transitory memory devices such as, for example, volatile and/or non-volatile memory that may be either fixed or removable. The memory 414 may be configured to store information, data, applications, instructions or the like for enabling the apparatus 402 to carry out various functions in accordance with one or more example embodiments. For example, the memory 414 may be configured to buffer input data for processing by the processor 412. Additionally or alternatively, the memory 414 may be configured to store instructions for execution by the processor 412. As yet another alternative, the memory 414 may include one or more databases that may store a variety of files, contents or data sets. Among the contents of the memory 414, applications may be stored for execution by the processor 412 in order to carry out the functionality associated with each respective application. In some cases, the memory 414 may be in communication with the processor 412 via a bus for passing information among components of the apparatus 402.

The processor 412 may be embodied in a number of different ways. For example, the processor 412 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In some example embodiments, the processor 412 may be configured to execute instructions stored in the memory 414 or otherwise accessible to the processor 412. As such, whether configured by hardware or by a combination of hardware and software, the processor 412 may represent an entity (e.g., physically embodied in circuitry—in the form of processing circuitry 410) capable of performing operations according to embodiments of the present invention while configured accordingly. Thus, for example, when the processor 412 is embodied as an ASIC, FPGA or the like, the processor 412 may be specifically configured hardware for conducting the operations described herein. Alternatively, as another example, when the processor 412 is embodied as an executor of software instructions, the instructions may specifically configure the processor 412 to perform one or more operations described herein.

In some example embodiments, the processor 412 (or the processing circuitry 410) may be embodied as, include, or otherwise control a multicast reception manager 420. As such, the multicast reception manager 420 may be embodied as various means, such as circuitry, hardware, a computer program product comprising computer readable program instructions stored on a computer readable medium (for example, the memory 414) and executed by a processing device (for example, the processor 412), or some combination thereof. The multicast reception manager 420 may be capable of communication with one or more of the memory 414, user interface 416, or communication interface 418 to access, receive, and/or send data as may be needed to perform one or more of the functionalities of the multicast reception manager 420 as described herein.

Referring again to FIG. 2, in some example embodiments, the multicast delivery controller 320 is configured to cause the access point 202 to multicast data (e.g., a file, raw data, unformatted data, video data, audio data, multimedia data, and/or the like) to the members of a multicast group. In this regard, the access point 102 may multicast data to members of a multicast group by a cellular link, or other wireless link, such as the link 204 illustrated in FIG. 2. The members of the multicast group may, for example, comprise a plurality of devices 208. Accordingly, the multicast reception manager 420 associated with a device 208 may be configured to manage receipt of data multicast by the access point 202. Three such devices 208 are illustrated by way of example in FIG. 2. It will be appreciated, however, that a multicast group may comprise any number n of devices, where n is greater than or equal to 2. The devices 208 may additionally be members of a D2D cluster, as denoted by the D2D coverage area 206. In this regard, devices in the D2D cluster may communicate via one or more D2D links 214, as illustrated in FIG. 2.

One or more late joining devices 210 may desire the same data as is being multicast to the devices 208, and may be within the D2D coverage area 206. In this regard, for example, the late joining device 210 may comprise a mobile communications device, and may enter the D2D coverage area 206 subsequent to initiation of the multicast, as illustrated by the path 212. As another example, the late joining device 210 may have been within the D2D coverage area 206 at the time of initiation of the multicast, but may not have requested the data until after initiation of the multicast.

The multicast delivery controller 320 is configured in some example embodiments to determine whether to add the late joining device 210 to the multicast group for reception of the in-progress multicast. This decision may, for example, be made based at least in part on a D2D measurement report reporting D2D link conditions between the late joining device 210 and one or more devices 208.

In an instance in which a late joining device 210 is added to the multicast group for receipt of an in-progress multicast, the multicast delivery controller 320 of some example embodiments is configured to cause an indication of the late joining device 210 joining the multicast group to be sent to the devices 208 participating in the multicast prior to the late joining device 210 joining the multicast group. The indication may be indicative of a point at which the late joining device began to participate in the multicast such that the multicast reception manager 420 may be able to determine the portion of the data multicast prior to the late joining device 210 beginning to participate in the multicast, which the late joining device 210 will not receive via the multicast.

In some example embodiments, the multicast delivery controller 320 may mark a last data portion (e.g., packet) successfully transmitted in the multicast prior to the late joining device 210 joining the multicast group. In this regard, the multicast delivery controller 320 may, for example, store or otherwise note an index value of the last data portion successfully transmitted in the multicast prior to the late joining device 210 joining the multicast group. The indication of the late joining device 210 joining the multicast group that is sent to the devices 208 in some example embodiments may include an indication of the marked last data portion. For example, in accordance with some example embodiments, the multicast delivery controller 320 may mark the latest completed PDCP sequence number (SN) and hyper frame number (HFN) and multicast the latest completed PDCP sequence number (SN) and hyper frame number (HFN) to members of the multicast group, including the late joining device 210, in response to the late joining device 210 joining the multicast group.

The multicast delivery controller 320 may additionally perform one or more operations to prepare for continuation of the multicast subsequent to the late joining device 210 joining the multicast group. For example, the multicast delivery controller 320 may adjust the PDCP transmit window to start from the marked PDCP SN+1. The multicast delivery controller 320 may further reset one or more of the radio link control (RLC) transmit window, the PDCP SN, and the timers associated with the multicast.

The multicast delivery controller 320 may accordingly continue to cause the access point 202 to multicast the data to members of the multicast group, including the late joining device. In this regard, multicast of the data may continue from the point at which the late joining device 210 joined the multicast group with the late joining device 210 missing the portion of the data multicast prior to the late joining device 210 beginning to participate in the multicast.

The multicast reception manager 420 associated with a device 208 may receive an indication of a late joining device 210 joining the multicast group. The multicast reception manager 420 may determine based at least in part on the indication that a late joining device has joined the multicast group subsequent to initiation of the multicast. In response to the determination, the multicast reception manager 420 may use the received indication to mark the point (e.g., a SN or other data sequence number) at which the late joining device 210 began to participate in the multicast. In marking this point, the multicast reception manager 420 may, for example, store or otherwise note an index value of the last data portion (e.g., the index value of the SN or other data sequence number corresponding to the last transmitted data portion) successfully transmitted in the multicast prior to the late joining device 210 joining the multicast group. In marking the point, the multicast reception manager 420 may trace the point to the application layer from the PDCP layer through cross-layer interaction and mark the point in the application layer. For example, the multicast reception manager 420 may trace the application layer SN through cross-layer interaction and mark the application layer SN. The multicast reception manager 420 may further reset an RLC receive window and timers associated with the multicast such that data multicast subsequent to the late joining device 210 beginning to participate in the multicast may be synced with adjustments that may be made to the RLC transmit window and timers at the access point 202.

After joining the multicast group, the multicast reception manager 420 associated with the late joining device 210 may set reception parameters to correspond with the point in the multicast at which the late joining device 210 joined the multicast group. For example, the PDCP receive window of the late joining device 210 may be set to start from the marked SN+1. In this regard, the late joining device 210 may have access to the marked SN in embodiments in which the access point 202 multicasts the marked SN to devices in the multicast group with the indication that the late joining device 210 has joined the multicast group. The late joining device 210 may accordingly receive the portion of data multicast after joining the multicast group via multicast.

The multicast delivery controller 320 may select one or more of the devices 208 to send the portion of the data multicast prior to the late joining device 210 joining the multicast group via D2D communication over a D2D link 214. In this regard, the multicast delivery controller 320 may allocate resources for D2D communication between the selected device(s) 208 and the late joining device 210 to transmit the portion of the data to the late joining device 210.

The multicast delivery controller 320 may select one or more devices 208 to send the missing portion of data to the late joining device 210 prior to completion of the multicast, such that the late joining device 210 may receive the missing portion of the data via D2D communication while the multicast is ongoing. Alternatively, the multicast delivery controller 320 may select one or more devices 208 to send the missing portion of data to the late joining device 210 after completion of the multicast, such that the late joining device 210 does not receive the missing portion of the data via D2D communication until completion of the multicast. The multicast delivery controller 320 of some example embodiments is configured to determine whether to select a device(s) 208 before or after completion of the multicast based upon the type of data being multicast and/or link conditions. For example, if the data is related to a time sensitive service and/or if there is a relatively high latency delay, the multicast delivery controller 320 may select a device(s) 208 prior to completion of the multicast to reduce the time that it takes for the late joining device 210 to receive the entirety of the data by having the missing portion of the data transmitted to the late joining device 210 via D2D communication concurrent with multicast of the remaining data by the access point 202.

The multicast reception manager 420 associated with a device 208 selected to send a missing portion of data to the late joining device 210 may determine, based at least in part upon the marked point at which the late joining device 210 began to participate in the multicast, a portion of the data to send to the late joining device 210. For example, if only a single device 208 is selected, the multicast reception manager 420 may determine to send the entirety of the portion of data multicast prior to the late joining device 210 beginning to participate in the multicast. This portion may be defined by the range of the first data portion to the marked data portion (e.g., SN=1 to $SN_{mark}$).

If multiple devices 208 are selected to send the missing portion of data to the late joining device 210, the multicast reception managers 420 may divide up the portion of data multicast prior to the late joining device 210 beginning to participate in the multicast based on one or more criteria for dividing responsibility for sending the missing data portion to the late joining device 210. For example, in accordance with some example embodiments, the multicast reception managers 420 of the selected devices 208 may divide responsibility as follows:

(1) The missing portion of data multicast prior to the late joining device 210 beginning to participate in the multicast may be denoted in the application layer of a device 208 as the portion from SN=1 to $SN_{mark}$. The number of selected devices 208 may be denoted as N. Accordingly, the missing portion of data may be divided into N parts: $1$~$SN_1$, $SN_1$~$SN_2$ . . . $SN_{N-1}$~$SN_{mark}$.

(2) The selected devices 208 may take responsibility of each part according to some criteria. For example, the device 208 with the smallest device identifier in the cluster may be responsible for transmitting the first part, $1$~$SN_1$, to the late joining device 210; the device 208 with the second smallest device identifier in the cluster may be responsible for transmitting the second part, $SN_1$~$SN_2$, to the late joining device 210; and so forth.

(3) Each part may be equal length or different according to any criteria. For example, the length may be proportional to the D2D channel quality from the respective device 208 to the late joining device 210.

In embodiments wherein multiple devices 208 are selected and responsibility for sending the missing data portion to the late joining device 210 is divided among the selected devices 208, if one of the devices 208 fails to receive a multicast packet (e.g., the device non-acknowledged "NACKed" receiving the packet) from the access point 202, one of the devices that has acknowledged (e.g., "ACKed") receiving the packet may be assigned by the access point 202 to retransmit the packet to the NACKed device via D2D communication prior to sending its portion of the missing data to the late joining device 210. The other ACKed devices may transmit their portions of the missing data to the late joining device 210 via D2D communication.

In some example embodiments wherein the missing data portion is sent to the late joining device 210 while multicast is ongoing by multiple devices, the selected devices 208 may transmit the missing data portion whenever there is a chance. Assuming the block error rate from the access point 202 to each device is equal and denoted as "BLER" and there were N devices 208 in the cluster prior to the late joining device 210 joining, the probability of the chance for the file fill up is $$P_{fill\text{-}up\text{-}chance} = (1-\text{BLER})(1 - C_N^0 \text{BLER}^N - C_N^1 \text{BLER}^{N-1}(1-\text{BLER}))$$

If BLER=0.1 and N=3, then $P_{fill\text{-}up\text{-}chance}$=87.48%.

Accordingly, transmission of the missing data portion while multicast is ongoing in accordance with some example embodiments significantly reduces the latency delay, and may be advantageous for application to multicasting of time-sensitive services.

FIG. 5 illustrates an example signaling diagram of signals that may be exchanged to facilitate multicast service in accordance with some example embodiments. In this regard, FIG. 5 illustrates an example signaling diagram in which a single device is selected to transmit a missing portion of a file to a late joining device following completion of the multicast. The example of FIG. 5 may be implemented in a cellular network implementing LTE technology (e.g., LTE, LTE-Advanced, or other present or future variation of LTE technology).

In the example of FIG. 5, there is a cluster of UEs—the UE1 502, UE2 504, and UE3 506—which are participating in a multicast download of a file from an eNB 510. The UE1 502, UE2 504, and UE3 506 may accordingly comprise embodiments of a device 208. The eNB 510 may similarly comprise an embodiment of an access point 202. In the example of FIG. 5, it may be assumed that if a UE fails to receive a packet while other UEs in the cluster successfully receive the packet, intra-cluster retransmission of the NACKed packet via D2D communication may be triggered from an ACKed UE to the NACKed UE. Further, in the example of FIG. 5, the eNB 510 handles centralized scheduling, including D2D resource allocation.

At operation 512, the eNB 510 multicasts packets of the file to the original UEs participating in the multicast group, the UE1 502, UE2 504, and UE3 506. At operation 514, a late arriving device, the UE4 508 may be interested in the file and may transmit a request to download the file to the eNB 510. At the time of operation 514, a percentage of the file has already successfully downloaded by the cluster. Operation 516 may comprise the eNB 510 finding that the UE4 508 is within the cluster coverage and allocating a probing resource for UE4 508 probing with the other UEs in the cluster. Operation 518 may comprise cluster probing and measuring between the UEs in the cluster and UE4 508. At operation 520, the UE4 508 may send a measurement report based on the probing to the eNB 510. The eNB 510 may decide based on the measurement report to add the UE4 508 to the cluster and multicast group, at operation 522.

Operation 524 may comprise the eNB 510 marking the latest successfully transmitted PDCP SN and HFN. The eNB 510 may further multicasts the marked SN and HFN to the UEs in the cluster (now including the UE4 508), at operation 526. The multicast of the marked SN and HFN may additionally include a join cluster notification for the UE4 508, which may include the cluster ID (identification), UE ID for the UE4 508, resource grant, cluster UE number, and/or the like.

Operation 528 may comprise the eNB 510 adjusting the PDCP transmit window to start from the marked SN+1. Operation 530 may comprise the eNB 510 re-establishing RLC and resetting its RLC transmit window and timers.

Operation 532 may comprise the UE4 608 adjusting its PDCP receive window to start from the marked SN+1 based on the indication received in the transmission of operation 526. Operation 534 may comprise the UE1 502, UE2 504, and UE3 506 finding and marking the respective SN of the application layer based upon the indication received in the transmission of operation 526. Operation 536 may comprise the UE1 502, UE2 504, and UE3 506 performing RLC reestablishment and resetting their RLC receive windows and timers.

Operation 538 may comprise the eNB 510 continuing with multicast of packets of the file, continuing from the point in the file multicast at which the UE4 608 joined the multicast group (e.g., from the marked PDCP SN+1) to the updated cluster, including the late joining UE4 608. Operation 540 may optionally comprise a UE (e.g., an ACKed UE) transmitting a packet to a UE which failed to receive the packet (e.g., a NACKed UE) via D2D communication.

After multicasting of the file has completed, the UE 510 may select a UE from the original cluster to transmit the missing part of the file (e.g., the portion of the file multicast prior to the UE4 608 joining the cluster) to the UE4 608 via D2D communication. Operation 544 may comprise the eNB 510 sending the transceiver assignment and resource grant to the selected UE, which in the example is UE3 506.

In response to the selection and resource grant, the UE3 506 may find the marked application layer SN and start transmission of the file from the beginning to the marked SN via a D2D link with UE4 608, at operation 546. Operation 548 may comprise the UE4 508 reassembling the file in the application layer. Operation 548 may, for example, be performed while operation 546 is ongoing.

FIG. 6 illustrates another example signaling diagram of signals that may be exchanged to facilitate multicast service in accordance with some example embodiments. In this regard, FIG. 6 illustrates an example signaling diagram in which multiple devices are selected to transmit a missing portion of a file to a late joining device prior to completion of the multicast. The example of FIG. 6 may be implemented in a cellular network implementing LTE technology (e.g., LTE, LTE-Advanced, or other present or future variation of LTE technology).

In the example of FIG. 6, there is a cluster of UEs—the UE1 602, UE2 604, and UE3 606—which are participating in a multicast download of a file from an eNB 610. The UE1 602, UE2 604, and UE3 606 may accordingly comprise embodiments of a device 208. The eNB 610 may similarly comprise an embodiment of an access point 202. In the example of FIG. 5, it may be assumed that if a UE fails to receive a packet while other UEs in the cluster successfully receive the packet, intra-cluster retransmission of the NACKed packet via D2D communication may be triggered from an ACKed UE to the NACKed UE. Further, in the example of FIG. 5, the eNB 610 handles centralized scheduling, including D2D resource allocation.

At operation 612, the eNB 610 multicasts packets of the file to the original UEs participating in the multicast group, the UE1 602, UE2 604, and UE3 606. At operation 614, a late arriving device, the UE4 608 may be interested in the file and may transmit a request to download the file to the eNB 610. At the time of operation 614, a percentage of the file has already successfully downloaded by the cluster. Operation 616 may comprise the eNB 610 finding that the UE4 608 is within the cluster coverage and allocating a probing resource for UE4 608 probing with the other UEs in the cluster. Operation 618 may comprise cluster probing and measuring between the UEs in the cluster and UE4 608. At operation 620, the UE4 608 may send a measurement report based on the probing to the eNB 610. The eNB 610 may decide based on the measurement report to add the UE4 608 to the cluster and multicast group, at operation 622.

Operation 624 may comprise the eNB 610 marking the latest successfully transmitted PDCP SN and HFN. The eNB 610 may further multicast the marked SN and HFN to the UEs in the cluster (now including the UE4 608), at operation 626. The multicast of the marked SN and HFN may additionally include a join cluster notification for the UE4 608, which may include the cluster ID (identification), UE ID for the UE4 608, resource grant, cluster UE number, and/or the like.

Operation 628 may comprise the eNB 610 adjusting the PDCP transmit window to start from the marked SN+1. Operation 630 may comprise the eNB 610 re-establishing RLC and resetting its RLC transmit window and timers. Operation 632 may comprise the UE4 608 adjusting its PDCP receive window to start from the marked SN+1 based on the indication received in the transmission of operation 626. Operation 634 may comprise the UE1 602, UE2 604, and UE3 606 finding and marking the respective SN of the application layer based upon the indication received in the transmission of operation 626. Operation 636 may comprise the UE1 602, UE2 604, and UE3 606 performing RLC reestablishment and resetting their RLC receive windows and timers.

Operation 638 may comprise the eNB 610 continuing with multicast of packets of the file, continuing from the point in the file multicast at which the UE4 608 joined the multicast group (e.g., from the marked PDCP SN+1) to the updated cluster, including the late joining UE4 608. The multicast of operation 638 may include multicast of a packet "Packet X." UE1 602 may NACK receipt of Packet X, at operation 640, while UE2 604, UE3 606, and UE4 608 may ACK receipt of Packet X, at operations 642-646, respectively.

At operation 648, the eNB 610 selects one ACKed UE (except UE4) 608 to retransmit Packet X to the UE1 602 to the failed UE and schedules the corresponding resource. In the example of FIG. 6, UE2 604 is selected for retransmitting Packet X to UE1 602. Operation 648 may also comprise the eNB 610 selecting the rest of the ACKed UEs other than UE4 608 to transmit their responsible portions of the file multicast prior to the UE4 608 joining the multicast group to the UE4 608 via D2D communication and scheduling the corresponding resources. Operation 648 may further comprise the eNB 610 multicasting the transceiver assignment(s) and the resource grant(s).

Operation 650 may comprise the UE2 604 retransmitting Packet X to UE1 602 via D2D communication based on the transmission of operation 648. Operation 652 may comprise the UE3 606 transmitting its responsible part of the portion of the file that was multicast prior to the UE4 608 joining the multicast group to the UE4 608 via D2D communication. At operation 656, the UE3 604 may confirm to the eNB 610 that it has finished transmitting its responsible part of the file to the UE4 608 so that the eNB 610 will not continue to schedule resources for transmission of the UE3 604's responsible part to the UE4 608.

At operation 658, multicast of the file may be complete. If the UE4 608 has not yet received all of the missing portion of the file that was multicast prior to the UE4 608 joining the multicast group via D2D communication, operation 660 may comprise the eNB 610 scheduling D2D resources for the eNB1 602 and eNB2 604 to complete transmission of their responsible parts of the file to the UE4 608 via D2D communication. In response to the signaling and resource grant of operation 660, the UE1 602 and UE2 604 may send their responsible parts of the file to the UE4 608, at operation 662. Each unfinished UE may continue to transmit its responsible part to UE4 608 until completing transmission of its responsible part. When the UE1 602 and UE2 604 complete transmission of their responsible parts, they may send confirmation to the eNB 610, as illustrated in operations 666 and 664, respectively.

The UE4 608 may reassemble the file in its application layer by combining portions of the file received by multicast with portions received via D2D communication from the UE1 602, UE2 604, and UE3 606.

Referring now to FIG. 7, FIG. 7 illustrates a flowchart according to an example method for facilitating multicast service according to some example embodiments. In this regard, FIG. 7 illustrates operations that may be performed at a device 208. The operations illustrated in and described with respect to FIG. 7 may, for example, be performed by, with the assistance of, and/or under the control of one or more of the processing circuitry 410, processor 412, memory 414, communication interface 418, or multicast reception manager 420. Operation 700 may comprise receiving data multicast to members of a multicast group. The processing circuitry 410, processor 412, memory 414, communication interface 418, and/or multicast reception manager 420 may, for example, provide means for performing operation 700. Operation 710 may comprise determining, based at least in part on an indication received during multicast of the data, that a late joining device has joined the multicast group subsequent to initiation of the multicast. The processing circuitry 410, processor 412, memory 414, and/or multicast reception manager 420 may, for example, provide means for performing operation 710. Operation 720 may comprise marking, based at least in part on the received indication, a point at which the late joining device began to participate in the multicast. The processing circuitry 410, processor 412, memory 414, and/or multicast reception manager 420 may, for example, provide means for performing operation 720. Operation 730 may comprise determining, based at least in part on the marked point, a portion of the data to send to the late joining device. The determined portion may comprise at least a portion of the data multicast prior to the late joining device beginning to participate in the multicast. The determination of operation 730 may be further based on how many devices have been selected by the access point multicasting the data to send the portion of the data multicast prior to the late joining device joining the multicast group to the late joining device. The processing circuitry 410, processor 412, memory 414, and/or multicast reception manager 420 may, for example, provide means for performing operation 730. Operation 740 may comprise causing the determined portion of the data to be sent to the late joining device via a device to device connection. The processing circuitry 410, processor 412, memory 414, communication interface 418, and/or multicast reception manager 420 may, for example, provide means for performing operation 740.

Referring now to FIG. 8, FIG. 8 illustrates a flowchart according to another example method for facilitating multicast service according to some example embodiments. In this regard, FIG. 8 illustrates operations that may be performed at the access point 202. The operations illustrated in and described with respect to FIG. 8 may, for example, be performed by, with the assistance of, and/or under the control of one or more of the processing circuitry 310, processor 312, memory 314, communication interface 318, or multicast delivery controller 320. Operation 800 may comprise causing data to be multicast to members of a multicast group. The processing circuitry 310, processor 312, memory 314, communication interface 318, and/or multicast delivery controller 320 may, for example, provide means for performing operation 800. Operation 810 may comprise, responsive to a late joining device joining the multicast group subsequent to initiation of the multicast, causing an indication of the late joining device joining the multicast group to be sent to members of the multicast group. The processing circuitry 310, processor 312, memory 314, communication interface 318, and/or multicast delivery controller 320 may, for example, provide means for performing operation 810. Operation 820 may comprise continuing to cause the data to be multicast to members of the multicast group, including to the late joining device. The processing circuitry 310, processor 312, memory 314, communication interface 318, and/or multicast delivery controller 320 may, for example, provide means for performing operation 820. Operation 830 may comprise selecting at least one of the members of the multicast group participating in the multicast prior to the late joining device joining the multicast group to send the portion of the data multicast prior to the late joining device joining the multicast group to the late joining device via device to device communication. Operation 830 may be performed prior to or after conclusion of the multicast. The processing circuitry 310, processor 312, memory 314, communication interface 318, and/or multicast delivery controller 320 may, for example, provide means for performing operation 830. Operation 840 may comprise allocating resources for the device to device communication. The processing circuitry 310, processor 312, memory 314, communication interface 318, and/or multicast delivery controller 320 may, for example, provide means for performing operation 840.

Referring now to FIG. 9, FIG. 9 illustrates a flowchart according to yet another example method for facilitating multicast service according to some example embodiments. In this regard, FIG. 9 illustrates operations that may be performed at a late joining device 210. The operations illustrated in and described with respect to FIG. 9 may, for example, be performed by, with the assistance of, and/or under the control of one or more of the processing circuitry 410, processor 412, memory 414, communication interface 418, or multicast reception manager 420. Operation 900 may comprise joining a multicast group for an in-progress multicast. The processing circuitry 410, processor 412, memory 414, communication interface 418, and/or multicast reception manager 420 may, for example, provide means for performing operation 900. Operation 910 may comprise receiving an indication of a point in the data multicast at which the multicast has been joined. For example, the indication may comprise a PDCP sequence number or other indication of a last packet transmitted in the multicast. The processing circuitry 410, processor 412, memory 414, communication interface 418, and/or multicast reception manager 420 may, for example, provide means for performing operation 910. Operation 920 may comprise setting reception parameters to correspond with the point in the multicast at which the multicast has been joined. The processing circuitry 410, processor 412, memory 414, communication interface 418, and/or multicast reception manager 420 may, for example, provide means for performing operation 920.

Operation 930 may comprise receiving multicast data that is multicasted subsequent to joining the multicast group. The processing circuitry 410, processor 412, memory 414, communication interface 418, and/or multicast reception manager 420 may, for example, provide means for performing operation 930. Operation 940 may comprise receiving data multicast prior to joining the multicast group via device to device communications from one or more members of the multicast group. The processing circuitry 410, processor 412, memory 414, communication interface 418, and/or multicast reception manager 420 may, for example, provide means for performing operation 940. Operation 950 may comprise reassembling the data by combining the portions received via multicast with those received via device to device communication. Operation 950 may, for example, be performed in an application layer. The processing circuitry 410, processor 412, memory 414, communication interface 418, and/or multicast reception manager 420 may, for example, provide means for performing operation 940.

FIGS. 7-9 are flowcharts of a system, method and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts block(s). These computer program instructions may also be stored in a non-transitory computer-readable storage memory that may direct a computer or other programmable apparatus to function in a particular manner, such that the instructions stored in the computer-readable storage memory produce an article of manufacture the execution of which implements the function specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   multicasting data to members of a multicast group;
   determining, based at least in part on an indication received during the multicasting of the data, that a late joining device has joined the multicast group subsequent to initiation of the multicasting;
   marking a last packet data convergence protocol layer sequence number and hyper frame number successfully multicast to the multicast group prior to the late joining device joining the multicasting
   determining, based at least in part on the marked last packet data convergence protocol layer sequence number and hyper frame number, a portion of the data to send to the late joining device, the determined portion comprising at least a portion of the multicast data prior to the late joining device began to participate in the multicast; and
   controlling the determined portion of the data to be sent to the late joining device via a device-to-device connection.

2. The method of claim 1, wherein the marking denotes a portion of the multicast data prior to the late joining device beginning to participate in the multicast.

3. The method of claim 1, further comprising tracing a point at which the late joining device began to participate in the multicast to an application layer through cross-layer interaction and marking the point in the application layer.

4. The method of claim 3, wherein the tracing of the point comprises tracing the point through cross-layer interaction from a packet data convergence protocol layer to the application layer.

5. The method of claim 1, wherein the determining of the portion of the data to send to the late joining device comprises determining the portion of the data to send to the late joining device based on at least one criterion for dividing responsibility for sending the multicast data prior to the late joining device participating in the multicast among members of the multicast group present prior to the late joining device joining the multicast group.

6. The method of claim 1, wherein the controlling the determined portion to be sent comprises controlling the determined portion to be sent via a device-to-device resource granted by an access point for a cellular network.

7. A method comprising:
   controlling multicasting of data to members of a multicast group;
   controlling, in response to a late joining device joining the multicast group subsequent to initiation of the multicast, an indication of the late joining device joining the multicast group to be sent to the members of the multicast group participating in the multicast prior to the late joining device joining the multicast group, the indication being indicative of a point at which the late joining device began to participate in the multicast;

selecting at least one of the members, of the multicast group participating in the multicast prior to the late joining device joining the multicast group, to send to the late joining device, via device-to-device communication, a portion of the data multicast prior to the late joining device joining the multicast group; and continuing to control the multicasting of the data to the members of the multicast group, including the late joining device.

8. The method of claim 7, further comprising:

marking, in response to the late joining device joining the multicast group, a last packet data convergence protocol layer sequence number and hyper frame number successfully multicast to the multicast group prior to the late joining device joining the multicast, wherein the controlling of the indication of the late joining device joining the multicast group to be sent to members of the multicast group participating in the multicast prior to the late joining device joining the multicast group further includes controlling the marked packet data convergence protocol layer sequence number and hyper frame number to be sent.

9. The method of claim 8, further comprising:

in response to the late joining device joining the multicast group:

adjusting a packet data convergence protocol transmit window to start from the marked packet data convergence protocol layer sequence number incremented by one;

resetting a radio link control transmit window;

resetting a packet data convergence protocol sequence number; and resetting all timers associated with the multicast.

10. The method of claim 7, further comprising allocating resources for the device-to-device communication.

11. The method of claim 7, wherein the selecting of the at least one of the members of the multicast group comprises selecting the at least one of the members of the multicast group prior to completion of the multicast, thereby triggering the portion of the data to be sent to the late joining device while the multicast is ongoing.

12. The method of claim 7, wherein the controlling the multicasting of the data to the members of the multicast group comprises controlling the multicasting of the data by a cellular network access point to the members of the multicast group, and the members of the multicast group comprise at least one mobile phone.

13. An apparatus comprising:

circuitry configured to:

control multicasting of data to members of a multicast group;

control, in response to a late joining device joining the multicast group subsequent to initiation of the multicast, an indication of the late joining device joining the multicast group to be sent to the members of the multicast group participating in the multicast prior to the late joining device joining the multicast group, the indication being indicative of a point at which the late joining device began to participate in the multicast;

select at least one of the members, of the multicast group participating in the multicast prior to the late joining device joining the multicast group, to send to the late joining device, via device-to-device communication, a portion of the data multicast prior to the late joining device joining the multicast group; and continue to control the multicasting of the data to the members of the multicast group, including the late joining device.

14. The apparatus of claim 13, wherein the circuitry is further configured to mark, in response to the late joining device joining the multicast group, a last packet data convergence protocol layer sequence number and hyper frame number successfully multicast to the multicast group prior to the late joining device joining the multicast, and the control of the indication of the late joining device joining the multicast group to be sent to the members of the multicast group participating in the multicast prior to the late joining device joining the multicast group includes control the marked packet data convergence protocol layer sequence number and hyper frame number to be sent.

15. The apparatus of claim 14, wherein the circuitry is further configured to, in response to the late joining device joining the multicast group:

adjust a packet data convergence protocol transmit window to start from the marked packet data convergence protocol layer sequence number incremented by one;

reset a radio link control transmit window;

reset a packet data convergence protocol sequence number; and reset all timers associated with the multicast.

16. The apparatus of claim 13, wherein in the selection of the at least one of the members of the multicast group, the circuitry is configured to select the at least one of the members of the multicast group subsequent to completion of the multicast.

17. The apparatus of claim 13, wherein the apparatus is a cellular network access point, and the members of the multicast group comprise at least one mobile phone.

18. The apparatus of claim 13, wherein the circuitry is configured to allocate resources for the device-to-device communication.

19. The apparatus of claim 13, wherein the at least one of the members sends to the late joining device the portion of the data multicast prior to the late joining device joining the multicast group.

20. The apparatus of claim 19, wherein the at least one of the members sends the portion to the late joining device after the circuitry completes the multicasting of the data.

* * * * *